Patented May 4, 1926.

1,583,673

UNITED STATES PATENT OFFICE.

JULES HECTOR DE GRAER, OF BRUSSELS, BELGIUM.

METHOD OF PRODUCING HYDROGEN FROM WATER GAS.

No Drawing.  Application filed January 26, 1923.  Serial No. 615,167.

*To all whom it may concern:*

Be it known that I, JULES HECTOR DE GRAER, a subject of the King of the Belgians, residing at Brussels, in the Kingdom of Belgium, have invented certain new and useful Improvements in Methods of Producing Hydrogen from Water Gas (for which I have filed application in Belgium January 27, 1922, and in Germany June 13, 1922), of which the following is a specification.

My invention relates to an improved method for producing hydrogen from water-gas.

The methods hitherto known for the production of water-gas are generally based upon the separation of the hydrogen which is contained in the water-gas said separation being effected by absorbing the carbon monoxide and the carbon dioxide contained in the gas by suitable reagents for instance by aid of a milk of lime or of a solution of copper chlorid. In these known methods however, the said absorption constitutes in fact only an auxiliary operation and it is necessary in order to secure hydrogen in a suitable state of purity to cause the water-gas, already partially deprived from carbon monoxide and carbon dioxide, to react upon a carbid at a suitable temperature so as to fix the remaining portions of carbon monoxide and carbon dioxide, which operation takes place with a production of lime or of calcium carbonate and carbon.

It has also been already proposed to free water-gas, or other gases from carbon monoxid by causing the gases to pass over heated calcium oxid or heated calcium hydroxid with or without steam mixed with the gases or blown into the reaction chamber. In these known methods however when it was made use of calcium oxid this material was necessarily used in pieces and it has been found in practice that under the action of the steam, the conversion of the calcium oxid had as a result the rapid obstruction of the retorts in which the operation was carried out, thus stopping the production. Further, on account of the high temperature resulting from the reaction on an important mass of calcium oxid, the apparatus was soon injured and the production very irregular. On the other hand when it was made use of calcium hydroxid, this material was always employed in the pulverulent state as it results from the action of water upon calcium oxid which in practice is a constant source of trouble on account of the resistance which is then offered by the material to the passage of the gases.

One object of my invention is to avoid the said inconveniences and to secure the possibility of a continuous and constant production of pure hydrogen without danger of obstructing the retorts or other vessels in which the operation is carried out.

Another object of my invention is to increase the volume of hydrogen which can be obtained in one operation, and a further object of my invention is to secure the hydrogen in a purer state than hitherto.

According to my invention and with these objects in view, water gas which has been produced at a high temperature as for example at a temperature above 1000° C. so as to be composed so to speak only of hydrogen and carbon monoxide and the said gas is treated with dry calcium hydroxide in a granulated state which is heated at a temperature between 350 to 800° C.

In these conditions, the carbon monoxide combines with the dry calcium hydroxide to form calcium carbonate whilst the hydrogen is liberated; the hydrogen thus obtained is thus added to the hydrogen contained in the water-gas in such a manner that the volume of hydrogen obtained is then twice the volume of hydrogen contained in the water-gas.

To clearly understand the importance of this method it is to be considered that as it has been proved by the experiences of well known authorities the equilibrium of a mixture of carbon monoxide and carbon dioxide in the presence of carbon considerably varies with the temperature. Whereas at a temperature of 400° C. the proportion of carbon monoxide only amounts to 1% for 99% of carbon dioxide, it has been proven that at a temperature of 1000° C. the proportion of carbon monoxide amounts to 99.3% against 0.7% of carbon dioxide. As a consequence when use is made of water-gas which is produced at a high temperature for instance by conducting water-vapor upon incandescent carbon, the composition of said water-gas may be represented by the formula $H_2 + CO$.

If such gas is then caused to react upon dry calcium hydroxide ($Ca(HO)_2$) at a temperature comprised between 350° and 800° C. the following reaction takes place:

$$H_2 + CO + Ca(OH)_2 = CaCO_3 + 2H_2$$

giving thus in one operation a volume which is twice the volume of hydrogen which has been obtained by the methods hitherto known.

It will further be noted that the above described method is a most economical one as indeed it only requires the use of a very cheap material (calcium hydroxide) and further does away with use of calcium carbid which is rather expensive.

What I claim is:

The method of producing hydrogen from the reaction of water gas substantially free from carbon dioxide upon calcium hydroxide in a granulated state and at a temperature from 350° to 800° C.

In testimony whereof I have affixed my signature.

JULES HECTOR DE GRAER.